US010264066B2

(12) United States Patent
Fishler et al.

(10) Patent No.: US 10,264,066 B2
(45) Date of Patent: Apr. 16, 2019

(54) PEER-TO-PEER DATA SHARING BETWEEN INTERNET-OF-THINGS PLATFORMS

(71) Applicant: SAP Portals Israel Ltd., Ra'anana (IL)

(72) Inventors: Ido Fishler, Tel Aviv (IL); Barak Kinarti, Kfar Saba (IL); Daniel Turin, Ra'anana (IL); Adi Swissa, Ra'anana (IL); Eran Lahav, Kibutz Dvir (IL); Gilad Keinan, Kfar Saba (IL); Eliel Schurman, Binyamina (IL); Ohad Granica, Maccabim (IL); Eyal Nathan, Reut (IL); David Kviti, Tel Aviv (IL)

(73) Assignee: SAP Portals Israel Ltd, Ra'anana (IL)

( * ) Notice: Subject to any disclaimer, the term of this patent is extended or adjusted under 35 U.S.C. 154(b) by 311 days.

(21) Appl. No.: 15/188,165

(22) Filed: Jun. 21, 2016

(65) Prior Publication Data

US 2017/0331887 A1 Nov. 16, 2017

Related U.S. Application Data

(60) Provisional application No. 62/334,153, filed on May 10, 2016.

(51) Int. Cl.
*G06F 15/16* (2006.01)
*H04L 29/08* (2006.01)
*H04L 29/06* (2006.01)

(52) U.S. Cl.
CPC ...... *H04L 67/1087* (2013.01); *H04L 63/0428* (2013.01); *H04L 63/062* (2013.01); *H04L 65/4069* (2013.01); *H04L 67/104* (2013.01); *H04L 67/12* (2013.01); *H04L 67/141* (2013.01); *Y04S 40/18* (2018.05)

(58) Field of Classification Search
CPC .. H04L 67/104; H04L 67/141; H04L 65/4069
USPC ................. 709/202–203, 217–219, 227–228
See application file for complete search history.

(56) References Cited

U.S. PATENT DOCUMENTS

| | | | |
|---|---|---|---|
| 8,489,561 B1 | 7/2013 | Nathan et al. | |
| 8,875,060 B2 | 10/2014 | Barak et al. | |
| 8,965,987 B2 | 2/2015 | Lehmann et al. | |
| 9,009,230 B1 * | 4/2015 | Matthieu ................ | H04L 67/12 709/227 |
| 9,032,287 B2 | 5/2015 | Lehmann et al. | |
| 9,117,066 B2 | 8/2015 | Nathan et al. | |
| 9,158,556 B2 | 10/2015 | Barak et al. | |

(Continued)

*Primary Examiner* — Bharat Barot
(74) *Attorney, Agent, or Firm* — Fish & Richardson P.C.

(57) ABSTRACT

Techniques are described for sharing data among Internet of Things (IoT) networks. An IoT network may include a platform that collects data generated by IoT devices. The platform may execute an agent that sends a communication to indicate the network presence of the sending platform to broker module(s) that support a data sharing service. The communication may also indicate the type and/or quantity of data generated by the sending platform and available to be shared with other receiving platforms in other IoT networks. The data broker module(s) may generate and send security tokens to the agents executing on the sending platform and receiving platform(s). Using the security tokens, the respective agents may establish a peer-to-peer (P2P) connection over a network over which the data is streamed in real time as it is received and/or processed by the sending platform.

20 Claims, 10 Drawing Sheets

(56) References Cited

U.S. PATENT DOCUMENTS

| | | |
|---|---|---|
| 9,262,745 B2 | 2/2016 | Zur et al. |
| 9,342,618 B2 | 5/2016 | Lehmann et al. |
| 9,355,188 B2 | 5/2016 | Nathan et al. |
| 9,420,044 B2 * | 8/2016 | Gupta ............... H04L 67/16 |
| 9,755,894 B2 * | 9/2017 | Matthieu ........... H04L 67/141 |
| 2012/0162246 A1 | 6/2012 | Kinarti et al. |
| 2013/0127920 A1 | 5/2013 | Grinshpon et al. |
| 2013/0166678 A1 | 6/2013 | Barak et al. |
| 2014/0068545 A1 | 3/2014 | Lehmann et al. |
| 2014/0189804 A1 | 7/2014 | Lehmann et al. |
| 2014/0359735 A1 | 12/2014 | Lehmann et al. |
| 2014/0372427 A1 | 12/2014 | Lehmann et al. |
| 2015/0019714 A1 * | 1/2015 | Shaashua ........... H04L 67/12 709/224 |
| 2015/0026755 A1 | 1/2015 | Lehmann et al. |
| 2015/0201022 A1 * | 7/2015 | Kim ................... H04L 67/12 709/203 |
| 2015/0264138 A1 * | 9/2015 | Watts, Jr. ......... H04L 67/1095 709/203 |
| 2016/0048114 A1 * | 2/2016 | Matthieu ........... G05B 15/02 700/83 |
| 2016/0378270 A1 * | 12/2016 | Lee ................... G06F 3/0481 715/788 |

* cited by examiner

PEER-TO-PEER DATA SHARING BETWEEN INTERNET-OF-THINGS PLATFORMS

CROSS-REFERENCE TO RELATED APPLICATION

The instant application claims priority to U.S. Provisional Patent Application, Ser. No. 62/334,153, titled "Peer-to-Peer Data Sharing Between Internet-of-Things Networks," which was filed on May 10, 2016 and which is incorporated by reference into the instant application.

BACKGROUND

Recently, there has been a dramatic increase in the number of appliances, devices, vehicles, and/or other types of objects that include data collection, computing, sensing, and/or network communications capabilities in addition to their normal functionality. These objects, described as smart appliances, smart vehicles, smart buildings, smart infrastructure components, and so forth, may be organized into an Internet of Things (IoT), through which the objects may generate and exchange data. An IoT may enable objects to be sensed and controlled remotely over network(s), and the data generated by the objects may be collected, analyzed, or otherwise processed by computing devices and/or individuals. The large and ever-increasing quantity of data generated by IoT objects poses a challenge, given the limited capacity of traditional systems to communicate, store, and process the data.

SUMMARY

Implementations of the present disclosure are generally directed to sharing data between IoT networks. More specifically, implementations are directed to a data sharing service that facilitates the establishment of peer-to-peer (P2P) connections for real time, secure streaming of data between IoT networks.

In general, innovative aspects of the subject matter described in this specification can be embodied in methods that include actions of: receiving an indication of data available from a first platform, the first platform communicatively coupled to a first set of Internet of Things (IoT) devices; determining a second platform communicatively coupled to a second set of IoT devices; and communicating at least one security token to the first platform and the second platform to cause the data to be streamed from the first platform to the second platform over a peer-to-peer (P2P) connection.

Implementations can optionally include one or more of the following features: the first platform executes a first agent that provides the indication of the data available from the first platform; the second platform executes a second agent; the at least one security token is communicated to enable the first agent and the second agent to establish the P2P connection; the streamed data includes at least one result determined through an analysis of raw data received at the first platform from the first set of IoT devices; the analysis is performed by at least one third party analysis module executing on the first platform; the streamed data is generated by processing raw data that is received by the first platform from the first set of IoT devices; the processing of the raw data includes one or more of aggregating the raw data, filtering the raw data, removing erroneous information from the raw data, or anonymizing the raw data to remove personally identifiable information (PII) that is present in the raw data; the at least one security token is communicated from a broker that is remote from at least one of the first platform or the second platform; the actions further include periodically communicating at least one updated security token to the first platform and the second platform while the P2P connection is active; the actions further include determining a value to be provided by the second platform to the first platform in exchange for the streamed data; and/or the data is streamed in real time as the data is generated by the first set of IoT devices.

Implementations provide various technical advantages and improvements over traditional systems. Traditional systems may enable data sharing between devices, or networks of devices, that are owned, operated, and/or provided by the same manufacturer or that are within the same ecosystem of data services. Implementations provide a data brokerage system that enables different IoT platforms to connect with one another and share data with one another, and the different IoT platforms may be part of different data and/or service ecosystems, and/or may be provided by different manufacturers.

Traditionally, systems that collect and process IoT data are configured to store the data in a centralized data storage, from which the data is retrieved for analysis and/or communication to other systems. Given the large and ever-increasing quantity of data generated by an IoT network, traditional systems are required to regularly add storage devices, processing capacity, and/or other computing resources in an attempt to keep up with the increasing amount of data. Accordingly, traditional systems for handling IoT data are not scalable as the amount of processed data increases over time. Implementations address this shortcoming in traditional systems by avoiding centralized storage and processing of IoT data. Instead of a first IoT network sending its data to a centralized server and/or data storage from which it is distributed to other entities, implementations employ a (e.g., direct) P2P network connection to transfer data from a first IoT network to a second IoT network, after the pairing of the sending and receiving networks has been brokered by data broker module(s). Accordingly, implementations avoid centralized storage and processing of IoT data and thus provide a more scalable solution than traditional systems. Moreover, by avoiding centralized storage and processing of IoT data, implementations consume less processing capacity, storage space, memory capacity, network bandwidth, and/or other computing resources compared to traditional (e.g., centralized) solutions.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
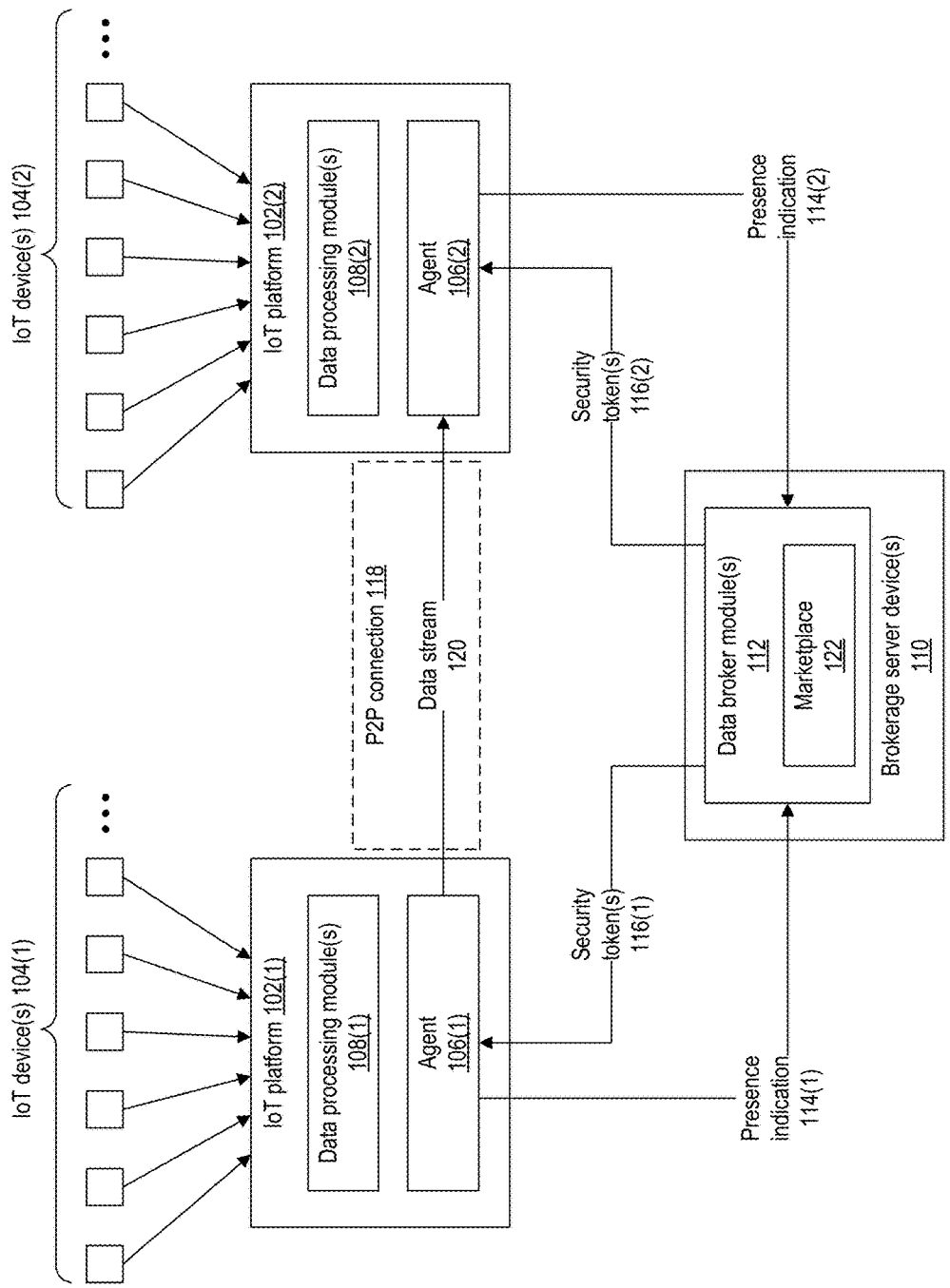
FIG. 1 depicts an example system for sharing data between IoT platforms, according to implementations of the present disclosure.

Implementations of the present disclosure are directed to systems, devices, methods, and computer-readable media for sharing data generated by an IoT network with one or more other IoT networks. An IoT network may include an IoT platform that collects data generated by IoT devices within the IoT network. In some implementations, the platform may execute an agent. The agent may send a communication that indicates the network presence of the platform to one or more data broker modules executing on brokerage server device(s). The communication may also indicate the type and/or quantity of data that is generated by the IoT network and available to be shared with other IoT networks. The data broker module(s) may determine one or more other IoT networks that may receive the data. Such other IoT networks may also each include an IoT platform that executes an agent. The data broker module(s) may generate and send security tokens to the agents executing on the data providing platform and the data receiving platforms. Using the security tokens, the respective agents on a data providing platform and a data receiving platform may establish a peer-to-peer (P2P) connection over a network. The agent on the data providing platform may stream data over the P2P connection to the agent on the data receiving platform. In some implementations, the data may be streamed in real time as it is received and/or processed by the data providing platform.

An IoT network may include any number of IoT devices that generate data and communicate the data to an IoT platform associated with the network. The IoT devices may include but are not limited to any of the following:

Portable computing devices, such as smartphones, tablet computers, electronic book readers, mobile gaming platforms, wearable computing devices, implanted computing devices, etc.;

Immobile and/or less readily portable computing devices, such as personal computers, laptop computers, mainframe computers, rack-mounted servers, etc.;

Media devices, such as televisions, audio output (e.g., stereo) systems, gaming platforms, digital video recording and/or playback devices, etc.;

Environmental monitoring sensors and/or devices, such as air quality sensors, water quality sensors, soil quality sensors; sensors to measure air temperature, air pressure, wind speed and direction, water temperature, water pressure, water flow speed and direction, seismic vibration sensors, seismic (e.g., earthquake) warning systems, inclement weather (e.g., hurricane, tornado) warning systems, tsunami or flood warning systems, wildfire monitoring or warning systems, etc.;

Infrastructure management systems, such as sensors and/or devices to measure the condition and/or maintenance status of buildings, roads, bridges, tunnels, railroads, airports, etc.;

Manufacturing systems, such as sensors and/or devices to monitor and/or control automated manufacturing processes, supply chain networks, shipping networks, etc.;

Energy management systems, such as sensors and/or devices to monitor the generation, distribution, storage, and/or usage of electrical power, natural gas, other petroleum-based fuels, and so forth, for a particular building, set of buildings, municipality, and/or larger area;

Healthcare systems, such as sensors and/or devices for remote healthcare, health or biometric monitoring of individuals, emergency notification, and/or managing healthcare facilities such as hospitals, clinics, and so forth;

Building and/or home automation systems, including sensors and/or devices for monitoring and controlling electrical and/or mechanical devices in buildings, monitoring structural conditions of buildings, monitoring environment conditions in buildings (e.g., temperature, air quality, etc.), controlling lighting, air circulation, water, or other in-building systems, and so forth;

Building security systems, including sensors and/or devices for controlling building access, detecting unauthorized access, alarm systems, door lock systems, fire or smoke detectors, flood detectors, air quality sensors and/or warning systems, etc.;

Vehicle computers, such as telematics devices, on-board computing systems, vehicle sensors, smart vehicle components, etc.;

Transportation systems, including sensors and/or other devices for monitoring and/or controlling automobile traffic on roads, railway networks, air traffic, water traffic, and so forth, such as traffic sensors, stoplight cameras, vehicle speed sensors and/or cameras, toll collection systems, fleet management systems, fixed and/or mobile surveillance cameras, etc.; and/or Automated and/or AI-enabled personal assistant devices for the home or other environments.

Traditionally, systems that collect and process IoT data are configured to store the data in a centralized data storage, from which the data is retrieved for analysis and/or communication to other systems. Given the large and ever-increasing quantity of data generated by an IoT network, traditional systems are required to regularly add storage devices, processing capacity, and/or other computing resources in an attempt to keep up with the increasing amount of data. Accordingly, traditional systems for handling IoT data are not scalable. Implementations address this shortcoming in traditional systems by avoiding centralized storage and processing of IoT data. Instead of a first IoT network sending its data to a centralized server and/or data storage from which it is distributed to other entities, implementations employ a (e.g., direct) P2P network connection to transfer data from a first IoT network to a second IoT network, after the pairing of the sending and receiving networks has been brokered by data broker module(s). Accordingly, implementations avoid centralized storage and processing of IoT data and thus provide a more scalable solution than traditional systems.

Implementations provide a data brokerage system that enables different IoT platforms to connect with one another and share data with one another. In some instances, a first IoT platform may collect IoT data from a plurality of IoT devices, and transfer at least a portion of the collected data to one or more second IoT platforms. Each data transfer between a pair of IoT platforms may be a stream of data over a direct P2P connection between the platforms. As used herein, a P2P connection is a network connection between two entities through which the two entities may communicate. A P2P connection may be a direct connection between the entities, e.g., a connection that does not involve any intermediary systems, devices, or processes beyond those that are used to establish and maintain the connection. For example, a P2P connection may employ general purpose network infrastructure and appliances such as hubs, routers, switches, backbone systems, routing protocols, physical data communication lines, wireless transceivers for sending and receiving wireless data signals, and/or other network components, but the P2P connection may be otherwise unmediated by other systems, devices, and/or processes. In some implementations, the data brokerage system may perform operations to enable the platforms to connect with one another and share data, but the data brokerage system may be disintermediated after the initial setup of the P2P connection and may not participate in the P2P connection. In some instances, the data brokerage system may provide security tokens to the platforms to enable a secure P2P connection to be established between the platforms. The data brokerage system may then be disintermediated from the connection apart from, in some implementations, periodically sending updated security tokens to the platforms as described further below.

Implementations enable any suitable type of IoT network to share data with any other suitable type of IoT network, using agents to provide a common format for the data to be shared. For example, an electric power company may manage a large number of IoT devices within a smart power grid that operates to supply power to a house, building, city block, city, and/or larger region. The various IoT devices may generate data including device status, operations statistics, the amount of power generated or transferred, temperature, air pressure, load on the system, and so forth. A second power company, or other utility company, may operate its own second IoT network and may purchase data generated by the first IoT network. The data from the first IoT network may enable the second IoT network to be operated more efficiently, thus saving money for the second IoT network and/or customers of the IoT network, and also providing environmental benefits through increased operational efficiency in power generation and usage.

As a particular example, a second power company may purchase a stream of IoT data from a first power company, enabling the second power company to more accurately predict power usage patterns and thus reduce the cost of producing power, reduce or eliminate excess production, and/or achieve other advantages. In instances where the second power company generates power using solar panels, wind turbines, hydroelectric systems, or other types of clean energy, the second power company may use the information from the first IoT network to better predict how much power production will be needed to meet expected consumption levels. This would lead to lower electricity bills for customers of the second power company, and also lead to more efficient use and/or conservation of resources.

As another example, a security company may operate an IoT network in a customer's home, including alarm systems, door and window monitors, motion sensors, cameras, smoke alarms, air quality alarms, and so forth. The security company may purchase data generated by an IoT network of a utility company. The data may provide real time information regarding power usage in the home. If the customer informs the security company that they are going out of town, the security company may monitor power usage in the home based on the streamed data from the utility company. If the utility data indicates that power consumption is not lower than normal, or otherwise indicates that the home may not be empty, the security company may notify the customer that there may be an unauthorized occupant in their home, and may also alert the local police to a possible intrusion.

FIG. 1 depicts an example system for sharing data between IoT platforms, according to implementations of the present disclosure. As shown in the example of FIG. 1, the system may include a first IoT platform 102(1) that manages a first IoT network of IoT device(s) 104(1). The system may also include a second IoT platform 102(2) that manages a second IoT network of IoT device(s) 104(2). Although this example illustrates the sharing of data from a first network to a second network, implementations are not so limited. Implementations support data sharing among any number of IoT networks that are physically co-located or remote from one another.

The system may also include one or more brokerage server devices 110 that execute one or more data broker modules 112 for providing a data brokerage (e.g., data sharing) service between IoT platforms. The data broker module(s) 112 may have access to information indicating each of the various IoT platforms that are participating in a data sharing service. The data broker module(s) 112 may have access to information describing the network location (e.g., network address) of each IoT platform, the type of data provided by the platform, the amount of data provided by the platform, and so forth. The data broker module(s) 112 may connect a data providing IoT platform 102(1) with a data consuming IoT platform 102(2) as described further below.

Each IoT platform 102 may receive data from the various IoT devices 104 in its IoT network. The IoT platform 102 may execute one or more data processing modules 108 that perform various types of processing of the raw data received from IoT devices 104. Such processing may include data aggregation, data filtering, removing (e.g., cleaning) erroneous and/or aberrant data from the raw data, data correlation, data analysis, anonymization of data, and so forth. In some implementations, at least a portion of the raw data may be cached or otherwise stored on the IoT platform 102 before and/or after being processed by the data processing module(s) 108.

An IoT platform 102 may execute an agent 106 that enables the platform to participate in the data sharing service. The agent may access the raw data generated by the IoT device(s) 104 and/or the processed data output from the data processing module(s) 108. The agent 106 may also interface and/or communicate with the data broker module(s) 112 to participate in the data sharing service. For example, the agent 106 may send a presence indication 114 to the data broker module(s) 112 over one or more networks, the presence indication 114 indicating a presence of the IoT platform 102. The presence indication 114 may identify the IoT platform 102 and/or provide a network address of the IoT platform 102, such as an internet protocol (IP) address. The presence indication 114 may also advertise the type, amount, and/or quantity of data that is available from the IoT platform 102 to be shared with other platform(s). For example, the agent 106 may advertise that its IoT platform 102 has temperature data that is collected from various IoT devices 104 with a collection frequency of approximately once per second, and that such data is available for sharing through the service. The agent 106 may indicate that this particular set of data is to be exposed for sale and/or consumption by other platforms. In some instances, the agent 106 may indicate that the data is anonymized to remove any personally identifiable information (PII) prior to streaming the data to other platform(s). The agent 106 may also describe the various other ways in which the data has been processed, e.g., to aggregate, analyze, clean, and/or filter the data. In some instances, the agent 106 may indicate that it has insight information available for sharing with other platform(s), where the insight information is the product of analyzing the raw data from the IoT devices. In some implementations, the data broker module(s) 112 may expose an application programming interface (API) that the agent(s) 106 use to communicate with the data broker module(s) 112.

In some implementations, the agent(s) 106 may impose a common format on the data being shared among IoT platforms 102. For example, the temperature data described above may be converted from Fahrenheit to Celsius, or vice versa, prior to being shared with other IoT platforms 102. In some implementations, the data broker module(s) 112 may impose a common unified data format for each of the various types of data shared between IoT platforms 102 through the data sharing service. Such a common unified data format may ensure that data sent from one platform is useable by other platforms.

In some implementations, the raw data from the IoT device(s) 104 may be aggregated over predetermined time periods, such as one second's worth of data aggregated to generate aggregate data. The aggregate data may then be streamed to other platforms. In some implementations, the shared data may be the results of analysis performed on the IoT platform by the data processing module(s) 108 and/or agent 106. The raw data from the IoT device(s) 104 may be analyzed to determine insights and/or other types of analytical results that may be shared, via data stream, with other platform(s). For example, the IoT device(s) 104 may include one or more accelerometers, gyroscopes, or other types of sensors that generate movement data indicating movement of the IoT device(s) 104 and/or user(s). That movement data may be analyzed to determine period(s) of time when a user is sitting, standing, walking, running, riding a bicycle, laying down, and so forth. Such analysis results may be shared with other platform(s) in a data stream.

In some implementations, the agent 106 may expose an API to enable plugin(s) of externally provided (e.g., third party) data processing module(s) 108 to an IoT platform 102. Such plugin(s) may enable analytic functionality by the agent 106 that would not otherwise be available on the IoT platform 102. In some instances, the plugin(s) may supplement and/or improve on the analytic functionality already present on the IoT platform 102. For example, an analytics company may have developed an algorithm to analyze data from stoplight cameras and/or other traffic cameras to determine whether a traffic violation has been committed by the driver of a vehicle. The algorithm may generate a report that may be sent to a municipality to enable its enforcement of traffic laws. The company may not have the resources or desire to install and/or operate the cameras themselves, so the company may provide a plugin data processing module 108 that may execute on another company's IoT platform 102 that supports existing physical infrastructure. The plugin may enable the IoT platform 102 to leverage the analytics developed by the analytics company. In some instances, a data processing module 108 may perform its processing on the IoT platform 102 itself. In some instances, a data processing module 108 (e.g., plugin or otherwise) may communicate raw data to an external service that performs the analysis and returns an analysis result to the data processing module 108.

In some implementations, a data providing IoT platform 102(1) may send a presence indication 114(1) describing the type, amount, frequency, and/or price of the data it has available for sharing with other platforms. A data consuming IoT platform 102(2) may send a presence indication 114(2) describing the type, amount, frequency, and/or price of the data that it is requesting to receive. The provider and/or consumer may indicate how frequently each can send or receive data, and/or how much data each can send or receive. In some instances, this metadata describing the data to be sent and/or received may be communicated from each respective agent 106 to the data broker module(s) 112. On receiving a request for data from a data consuming IoT platform 102, the data broker module(s) 112 may search available data streams from data producing IoT platform(s) 102 and may identify a potential seller and/or provider of the requested data. Alternatively, on receiving a presence indication describing data available from a data producing IoT platform 102, the data broker module(s) 112 may search for data consuming IoT platform(s) 102 that have requested such data, and may identify a potential buyer and/or consumer of the available data. In either instance, the data broker module(s) 112 may pair sending networks with receiving networks for data sharing.

After identifying a possible pairing of data providing platform 102(1) with data consuming platform 102(2), in some instances the data broker module(s) 112 may request that each agent 106(1) and 106(2) confirm an acceptance of term(s) (e.g., the price, amount, frequency, time period, etc.) of the data transfer transaction. On receiving confirmation from both agents 106, the data broker module(s) 112 may provide information to each agent 106 to enable the agents 106 to establish a P2P connection 118 over which a data stream 120 may be sent from the agent 106(1) to the agent 106(2). In some implementations, the information may include network addresses of the two platforms 102 and/or agents 106. The information may also include security tokens 116 that enable the establishment of a secure P2P connection 118 between the agents 106. In some implementations, the security tokens 116 may include cryptographic keys. The agents 106 may establish the P2P connection 118 through a secure handshake and/or other exchange and/or verification of the security tokens 116.

After the P2P connection 118 is established, the agent 106(1) may use the P2P connection 118 to send a data stream 120 of the requested data to the agent 106(2). In some implementations, the data is streamed over the P2P connection 118 in real time as the raw data is generated by the IoT devices 104 and/or processed by the IoT platform 102. Accordingly, a consumer of the data stream may access a real time, live, up-to-date stream of data provided by the data providing platform.

In some implementations, the security tokens 116 may be valid for a predetermined period of time, e.g., the security tokens 116 may include a time-to-live (TTL) during which they are useable to provide the P2P connection 118. The data broker module(s) 112 may periodically (e.g., every two seconds) generate new security tokens and send them to the agents 106. On receiving the updated security tokens 116, the agents 106 may then re-establish the P2P connection 118 using the updated security tokens 116. Changing (e.g., rotating) the security tokens 116 may ensure that the P2P connection remains secure and ensures that the data stream 120 cannot be accessed by other entities. Changing the security tokens 116 may also ensure that the agents 106 go through the data broker module(s) 112 to share data, instead of sharing data independently of the data sharing service managed by the data broker module(s) 112. In some instances, the purchase of data by the agent 106(2) may be valid for a particular period of time and/or for a particular amount of shared data, after which the security token 116 may no longer be valid. Implementations support various types of pricing models, such as pricing based on an amount (e.g., quota) of data or a subscription for a period of time (e.g., monthly, yearly, etc.). In some implementations, the particular price may be determined through an auction that is managed by the data broker module(s) 112. The pricing may be set by the data broker module(s) 112 and/or negotiated between the sending and receiving platforms 102. In some implementations, the data sharing service may charge a commission for its data brokerage, such as a percentage of a transaction or a fixed fee per transaction.

In some implementations, the data broker module(s) 112 include a marketplace 122. The marketplace 122 may facilitate the buying and/or selling of data through the data sharing service, as described further with reference to FIG. 4. Although examples herein may describe data sharing for a price, e.g., a transfer of value in exchanged for the shared data, implementations are not so limited. The data sharing service may also operate in situations where the data is shared between IoT platforms 102 free of charge. The data sharing service may also facilitate a data exchange in which a first platform provides a first type of data to a second platform in exchange for the second platform providing a second type of data to the first platform.

Figure 2:
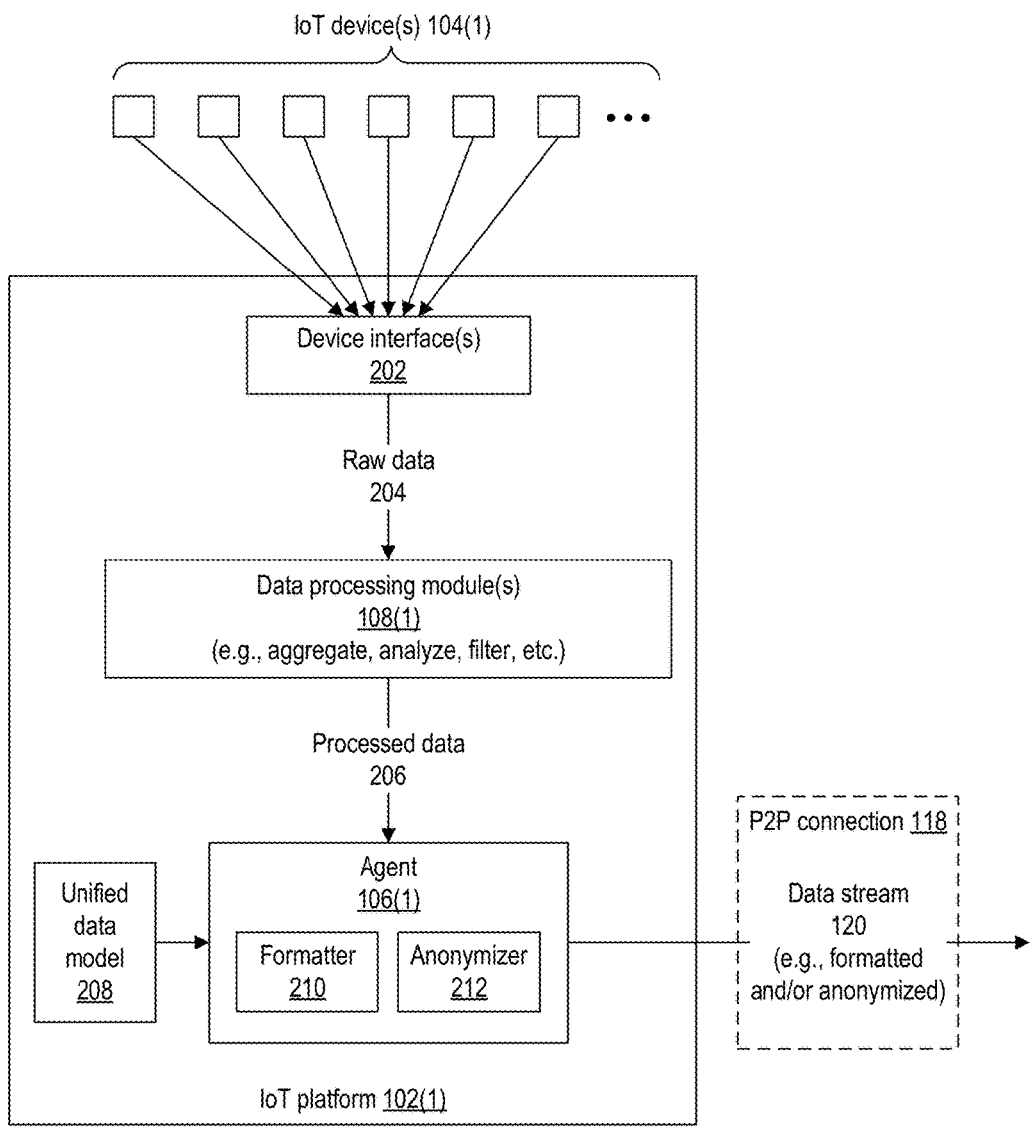
FIG. 2 depicts an example of an IoT platform, according to implementations of the present disclosure.

FIG. 2 depicts an example of an IoT platform 102, according to implementations of the present disclosure. In the example shown, the platform is an IoT platform 102(1) that operates as a data providing platform through a data sharing service brokered by the data broker module(s) 112. Any particular IoT platform 102 may operate as a data providing platform and/or a data consuming platform. For example a platform may act as a data providing platform (e.g., seller) for one data sharing transaction, and a data consuming platform (e.g., buyer) for another data sharing transaction.

The IoT platform 102 may include one or more device interfaces 202 that receive raw data 204 from any suitable number of IoT device(s) 104. The device interface(s) 202 may include wired and/or wireless network interface(s). In some implementations, the device interface(s) 202 may provide the raw data 204 to the data processing module(s) 108. The data processing module(s) 108 may process the raw data 204 to generate processed data 206. As described above, such processing may include aggregating, anonymizing, filtering, analyzing, correlating, anonymizing, and/or cleaning of data.

The agent 106 may receive the processed data 206. In some implementations, the agent 106 may include a formatter 210 and/or an anonymizer 212. The formatter 210 may format or reformat the processed data 206 according to a unified data model 208 provided by the data sharing service. The anonymizer 212 may remove and/or obfuscate any PII that may be present in the processed data 206. The agent 106 may establish the P2P connection 118 with a receiving agent 106(2) as described above, using the security token(s) 116 provided by the data broker module(s) 112. The agent 106 may then generate the data stream 120 that includes the processed data 206 that is, in some instances, formatted and/or anonymized. The data stream 120 may communicate the data from the sending agent 106(1) to the receiving agent 106(2).

In some instances, the IoT platform 102 may not include data processing module(s) 108. In such instances, the raw data 204 may be provided to the agent 106. The agent 106 may, in some instances, format and/or anonymize the raw data 204. The agent 106 may then communicate the (e.g., formatted and/or anonymized) raw data 204 to the receiving agent 106(2) through the data stream 120. The various types of processing of the data, such as aggregating, filtering, analyzing, cleaning, formatting, and/or anonymizing, may be performed by the data processing module(s) 108, the agent 106, or both the data processing module(s) 108 and the agent 106. In some instances, any of this processing may be performed externally to the IoT platform 102 through calls to external service(s) as described above.

Figure 3:
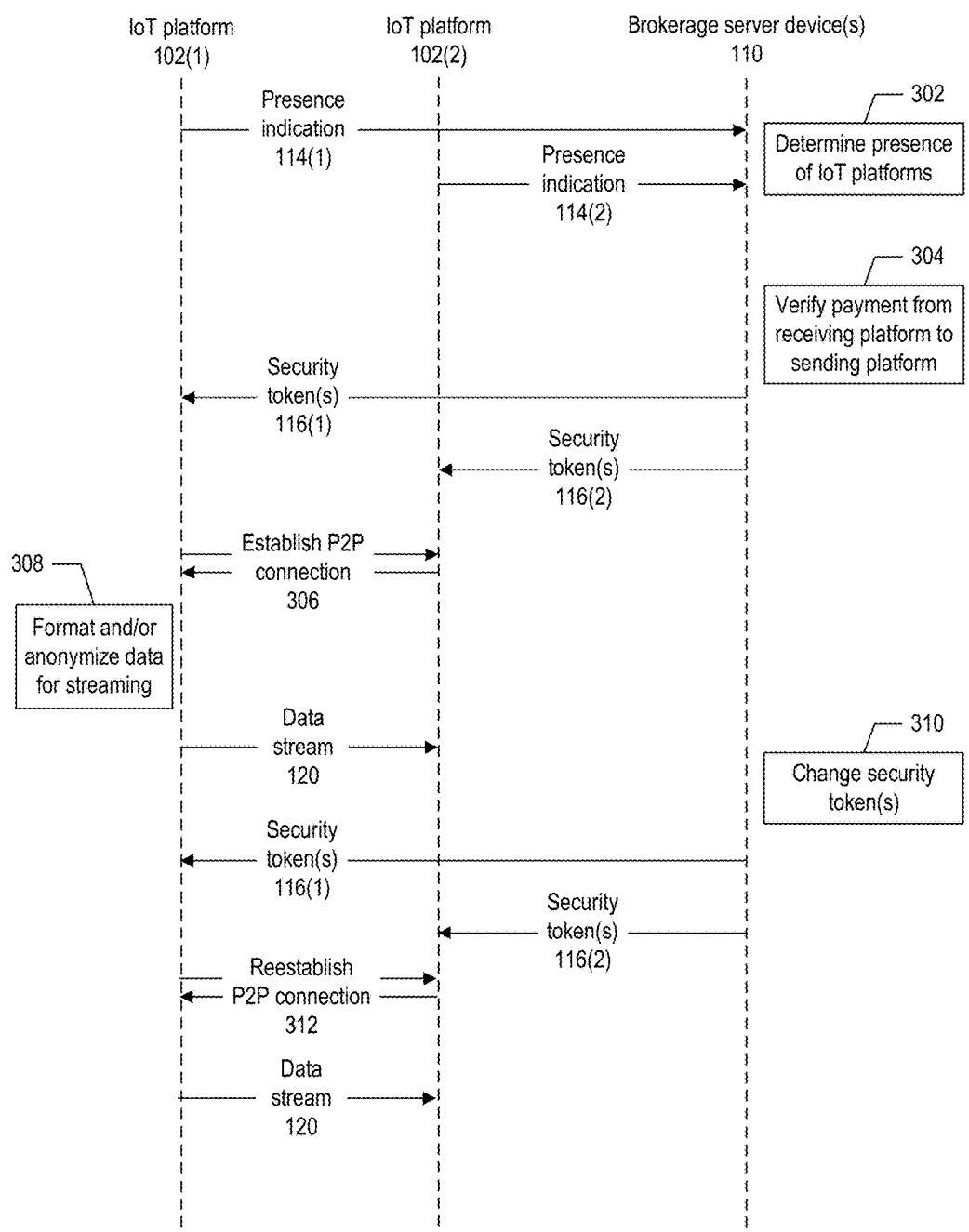
FIG. 3 depicts a diagram of an example process for sharing data between IoT platforms, according to implementations of the present disclosure.

FIG. 3 depicts a diagram of an example process for sharing data between IoT platforms 102, according to implementations of the present disclosure. The various operations shown in FIG. 3 may be performed by one or more of the agent(s) 106, data processing module(s) 108, data broker module(s) 112, and/or other software processes executing on the IoT platform(s) 102, the brokerage server device(s) 110, or elsewhere.

As shown in the example of FIG. 3, an IoT platform 102(1) may provide a presence indication 114(1) indicating data available to be shared with other platform(s). An IoT platform 102(2) may provide a presence indication 114(2) indicating data to be consumed by the IoT platform 102(2). The data broker module(s) 112 may determine the presence of the IoT platforms 102 (302) based at least partly on the presence indications 114 communicated from each respective IoT platform 102. In some implementations, the data broker module(s) 112 may also keep a registry of IoT platforms 102 that have previously registered to participate in the data sharing service. The presence indications 114 may be compared to the registry to determine whether the IoT platforms 102 advertising their presence are authorized participants in the data sharing service.

In some implementations where payment is to be exchanged for the shared data, the data broker module(s) 112 may verify (304) that payment has been provided from the receiving IoT platform 102(2) to the sending IoT platform 102(1). The data broker module(s) 112 may generate and send the security tokens 116(1) and 116(2) to the agents 106 executing on the IoT platforms 102(1) and 102(2) respectively. The agents 106 may then use the security tokens 116 to establish (306) a P2P connection 118 as described above. In some examples, the P2P connection 118 may be established through a handshake and/or other sequence of communications between the agents 106 during which the security tokens 116 are exchanged and/or verified.

The agent 106 on the IoT platform 102(1) may begin formatting and/or anonymizing (308) the data (e.g., the raw data 204 and/or processed data 206) and send the data to the IoT platform 102(2) in the data stream 120 using the P2P connection 118. In some implementations, the data broker module(s) 112 may periodically change (310) (e.g., modify, rotate) the security tokens 116, and provide the changed security tokens 116 to the agents 106 executing on the IoT platforms 102. The agents 106 may then use the modified security tokens 116 to reestablish (312) the P2P connection 118 and allow the data stream 120 to continue. In some instances, the data stream 120 may continue per the terms of the transaction, e.g., until the subscription period ends and/or the pre-agreed amount of data has been streamed.

Figure 4:
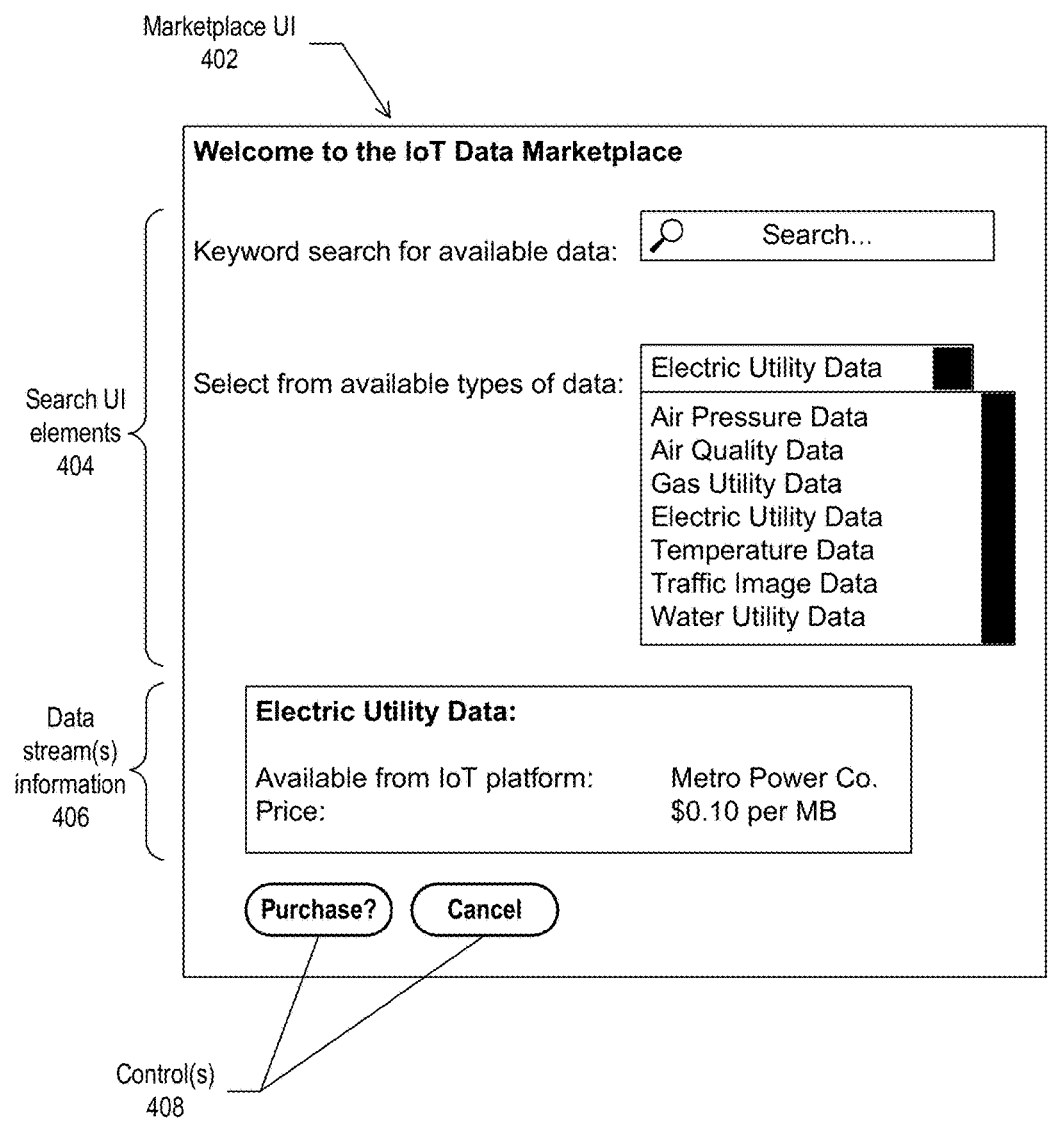
FIG. 4 depicts an example user interface for sharing data between IoT platforms, according to implementations of the present disclosure.

FIG. 4 depicts an example marketplace user interface (UI) 402 for sharing data between IoT platforms 102, according to implementations of the present disclosure. The marketplace UI 402 may be provided by the marketplace 122 that executes on the brokerage server device(s) 110.

In some implementations, a user such as an operator of an IoT network may access the marketplace UI 402 to find potentially useful and/or beneficial data to purchase and consume in their IoT network. The UI 402 may include search UI elements 404 that facilitate this search. In the example of FIG. 4, the search UI elements 404 include a search control that enables a user to input one or more search terms as a single term, a series of terms, and/or a Boolean combination of terms. The user may click a search control to prompt a search for IoT platform(s) 102 that have indicated that they can share data of a type that corresponds to the search term(s). If any such platform(s) 102 are found, the platform(s) may be identified in the data stream(s) information 406 portion of the UI 402.

The search UI elements 404 may also include a search control in the form of a drop-down list of available types of data, such as air pressure data, air quality data, gas utility data, electric utility data, temperature data, traffic image data, water utility data, and so forth. The user may select from these types, and the available platform(s) 102 corresponding to the selected type may be identified in the data stream(s) information 406.

The data stream(s) information 406 may identify one or more IoT platform(s) 102 that correspond to the search inputs, if any such platform(s) are identified. The data stream(s) information 406 may include a description of the type of data (e.g., electric utility data), a name or other identifier of the platform 102 (e.g., "Metro Power Co."), and/or a price of the data (e.g., $0.10 per megabyte (MB)). The data stream(s) information 406 may also provide other information that describes the data providing platform(s) 102.

The user may employ control(s) 408 (e.g., button(s)) to indicate a purchase of the identified data stream or a cancellation of the search results. Click the purchase control 408 may cause the data broker module(s) 112 to begin the process for verifying payment and sending the security tokens 116 to enable the data stream 120 as described above.

Figure 5A:
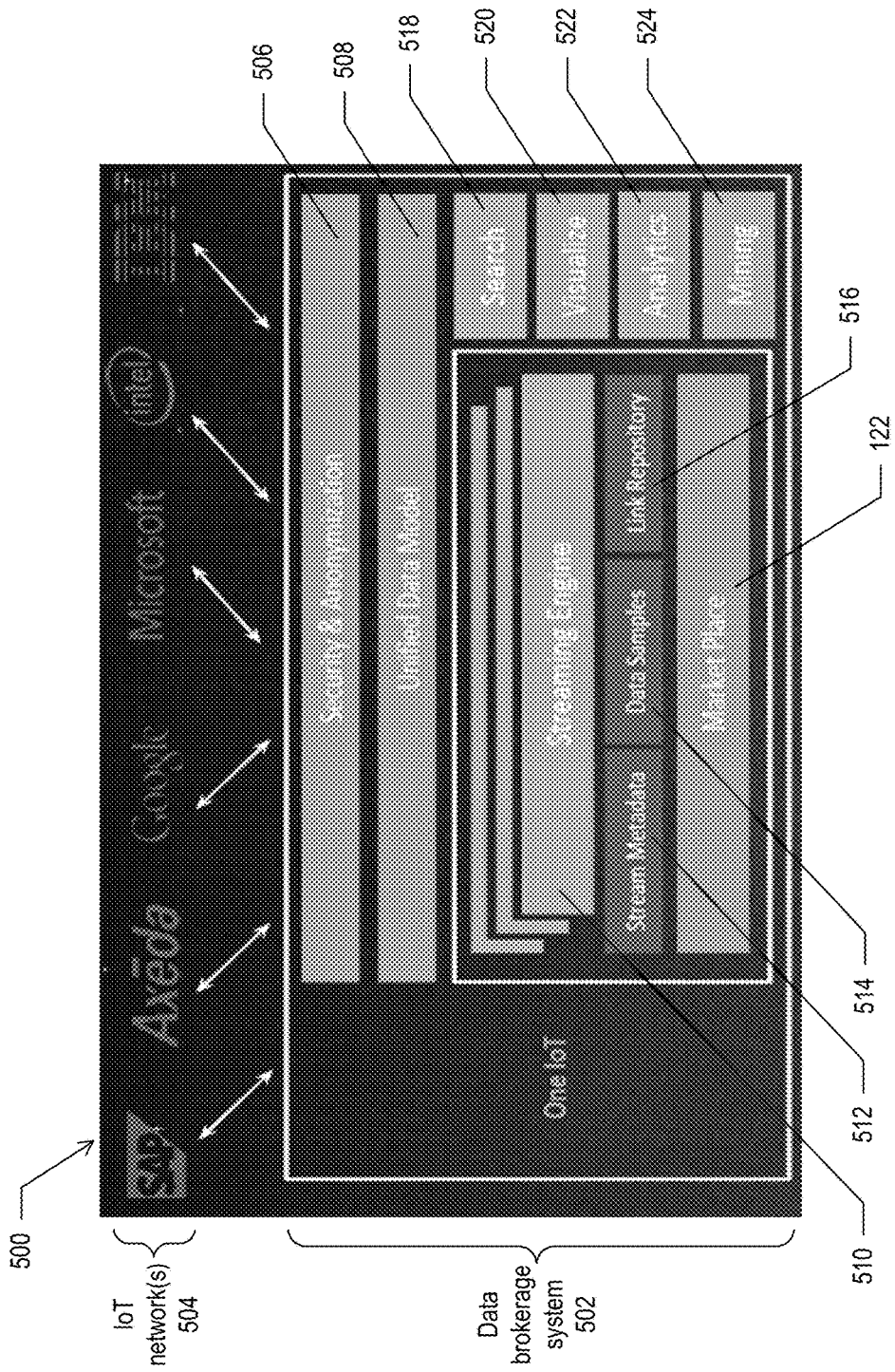
FIG. 5A depicts an example system for sharing data between IoT platforms, according to implementations of the present disclosure.

FIG. 5A depicts an example system to facilitate the sharing of data between IoT platforms 102, according to implementations of the present disclosure. FIG. 5A presents a schematic view 500 of the system shown in FIG. 1. As shown in the example of FIG. 5A, the data brokerage system 502 (e.g., labeled "One IoT" in the example) may support the sharing of data provided by various types of IoT networks 504 that are provided by various different vendors. The system may include features for security and/or anonymization 506 as described above. A unified data model 508 may be provided to ensure a common unified format of the data shared between platforms. The system may include any number of streaming engines 510, such as the agents 106, that operate on the various IoT platforms. Stream metadata 512 may describe, for each data stream made available by an IoT platform, the type, quantity, frequency, source platform, price, and/or other characteristics of the data stream. In some implementations, an agent 106 may provide data samples 514 to demonstrate the type and/or quality of the data available to be streamed from the agent's respective IoT platform. The data samples may be used by potential data purchasers to determine whether to purchase the data. A link repository 516 may store information regarding the previous and/or current P2P connections 118 used to stream data between IoT platforms. As described above, a marketplace 122 may be provided to facilitate the buying and selling of data through the system.

As further shown in the example of FIG. 5A, the system may include features for search 518, visualization 520, analytics 522, and/or data mining 524. The search feature may enable users to search for data that is available for sharing, as described with reference to FIG. 4. The system may provide data visualization to enable users to view (e.g., through the UI 402) shared data in the form of a graph (e.g., line graph, bar graph, pie graph, directed multi-node graph, etc.), table, data map, and/or other forms. The system may provide analytics through the data processing module(s) 108 as described above. The system may also provide data mining features to enable users and/or processes to mine the shared data to identify particular data that is useful in a particular scenario.

Figure 5B:
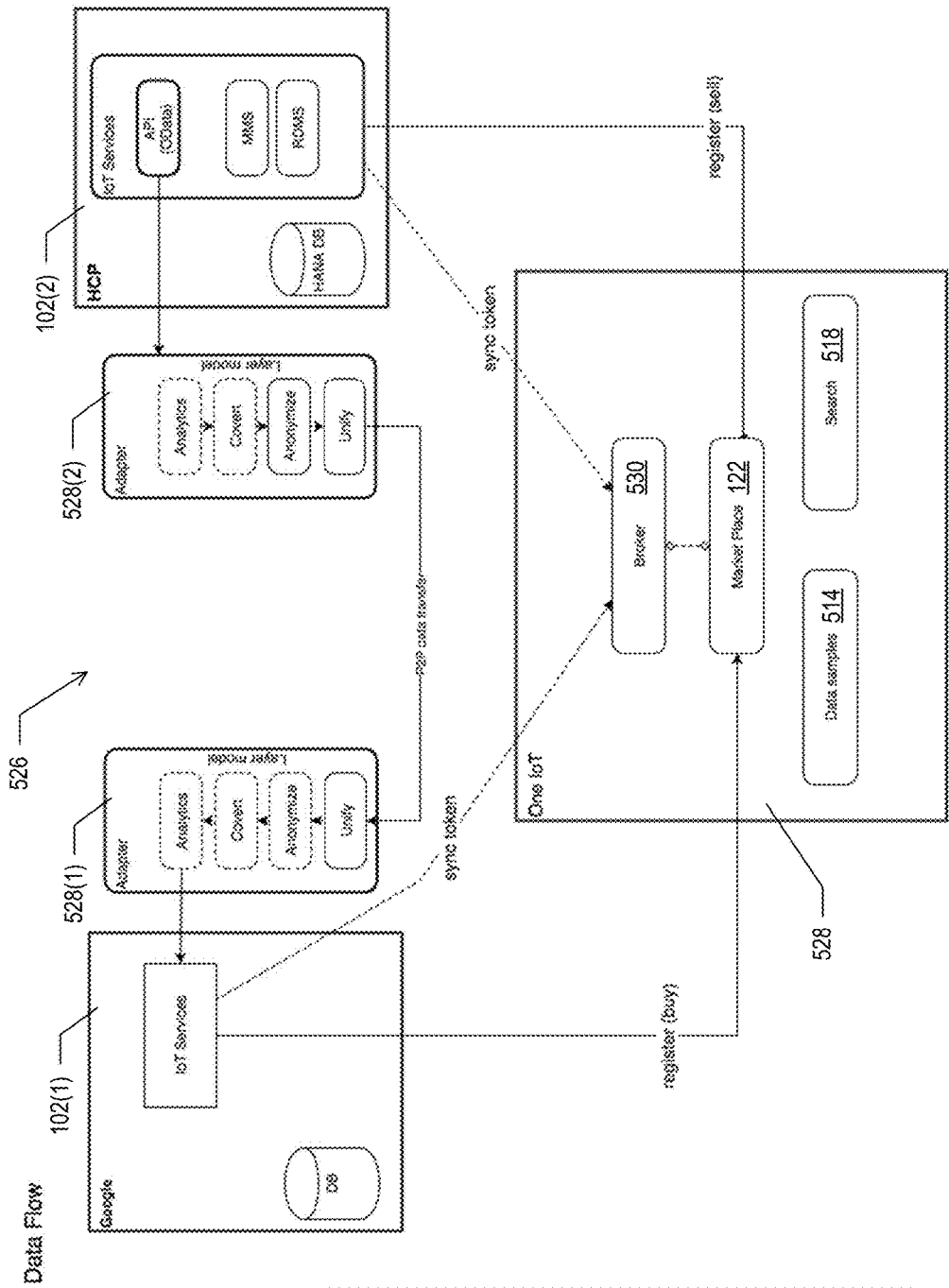
FIG. 5B depicts an example system for sharing data between IoT platforms, according to implementations of the present disclosure.

FIG. 5B depicts an example system 526 to facilitate the sharing of data between IoT platforms 102, according to implementations of the present disclosure. FIG. 5B presents a schematic view of the system shown in FIG. 1. In the example of FIG. 5B, the adapters 528(1) and 528(2) may correspond to the agents 106 that provide a layer model to support analytics, covert (e.g., security), anonymization, and unification of format. In the example shown, each adapter interfaces with IoT services provided by a platform 102 (e.g., labeled "Google" and "HCP" in the example). The data brokerage service 528, labeled "One IoT" in the example, may execute a broker 530 (e.g., data broker module(s) 112) and a marketplace 122. The service may provide search capabilities 518 as described herein, and may store the data samples 514 provided by various platforms. The broker may provide the sync tokens, e.g., security tokens 116, as described above.

Although in the example of FIG. 1 the agent 106 is shown as executing on or in the IoT platform, implementations are not so limited. In some instances, the agent 106 may execute externally with respect to the platform. The agent 106 may be in the same landscape and/or network as the platform (to allow fast access).

In some implementations, the data broker module(s) 116 may include metadata of actual data, data samples, a list of available registered peers (e.g., consumers and producers of data including free sources of data), and/or a security module that generates the security token(s) or key(s) and secures the data transfer.

Although in the example of FIG. 1 the marketplace 122 is shown as executing on the brokerage server device(s) 110 that provide the data sharing service (e.g., the "One IoT" service), implementations are not so limited. In some instances, the marketplace may execute on computing device(s) other than those which execute the data broker module(s) 112. The marketplace may communicate with the data broker module(s) and utilize information from the broker to enable searching, monitoring of the peers, registering a new peer (e.g., consumer or producer), and/or other functionality. The marketplace may also be described as a data network or data business network.

Consumers and producers of data may be buyers and sellers of data respectively. In some instances, consumers and producers may consume and produce data for free. Moreover, in some instances, the data may be produced by free and/or public data sources such as weather information, social media data, and so forth.

Implementations support various types of data analysis performed on the raw data received from IoT devices. The data may be analyzed by the agent 106 (e.g., adapter) and/or an external (e.g., third party) algorithm. Analysis may generate insights and/or predictive information that may be consumed by data consumers. For example, a smart toothbrush may collect data from multiple users' toothbrushes. The raw data from a toothbrush may include accelerometer and/or geolocation information reflecting the position and/or motion of a toothbrush. The raw data from a single toothbrush may not be particularly useful, but an analysis algorithm may operate to generate insights regarding the toothbrush usage of multiple users, such as an average number of seconds spent on each tooth, how thoroughly users tend to brush their teeth, how much time users spent on average brushing, and so forth. Such insight information may be sold to health insurance companies, researchers, and/or other entities interested in studying oral hygiene habits in a population.

In today's complex and interconnected technological infrastructure, companies from various industries may employ IoT solutions to improve their processes. For example, a utility company may monitor electricity consumption multiple homes to predict usage requirements in advance, in an effort to avoid unnecessary production. Another company, such as a security company, may also be interested in the data generated by the utility company. Traditionally, the two companies would need to build a custom integration solution that would cost a large amount of time, effort, and money. The implementations described herein provide a way to avoid such expenditures by providing a data brokerage service that enables companies that manage different IoT networks to exchange data in real time without the need to build a custom solution. The data brokerage service scales to other potential partners who may also choose to participate, and provides an affordable, efficient, and scalable solution for data sharing across any number of IoT networks.

The marketplace provides an entry point to enable parties to buy and/or sell IoT data. A user may explore the marketplace, view relevant data samples, purchase data stream subscriptions, and/or develop custom solutions on top of the purchased data streams. In this way, implementations support the concept of data as a service, facilitating cross platform and/or cross company trading of IoT device-generated data, facilitated by a single unified marketplace for buyers and sellers. Companies with an existing IoT solution can sell their IoT device-generated data and profit from the sale. Data purchasing companies can leverage this data, gain direct access to a constant and reliable data stream, and/or build their own solutions on top of the data stream.

Figure 5C:
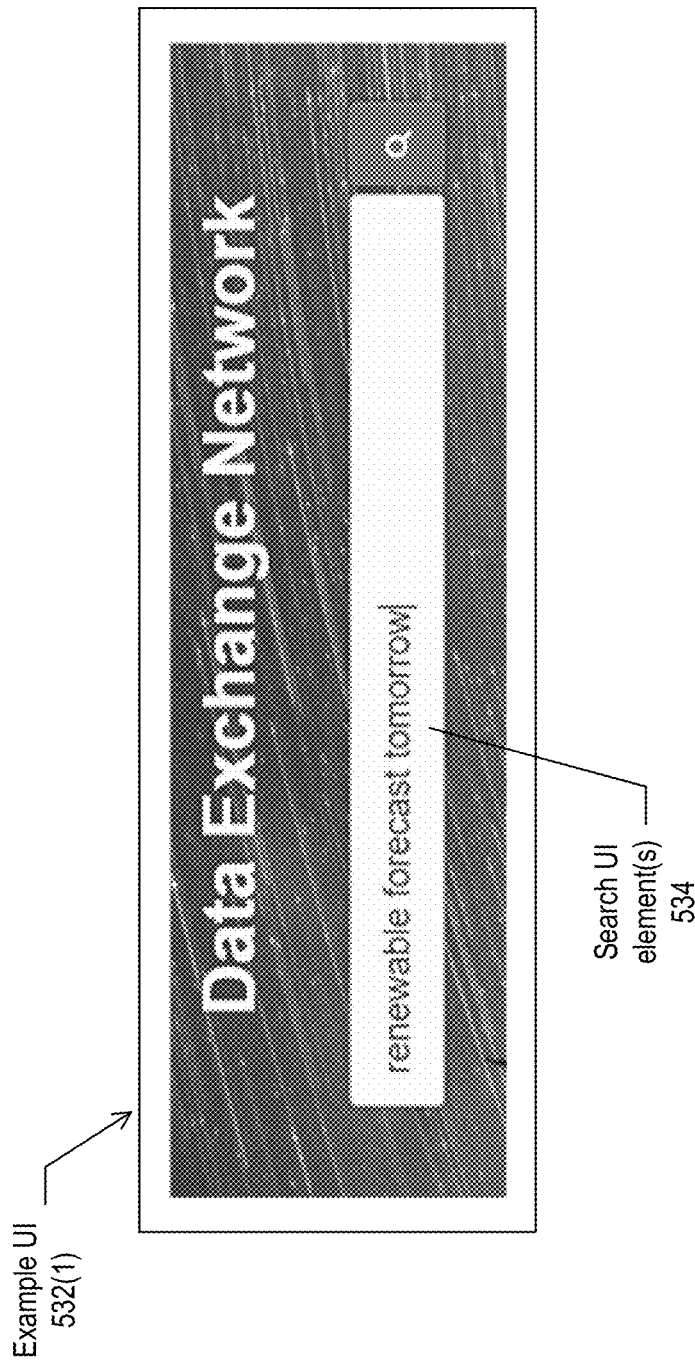
FIGS. 5C-5E depict example user interfaces for sharing data between IoT platforms, according to implementations of the present disclosure.
Figure 5D:
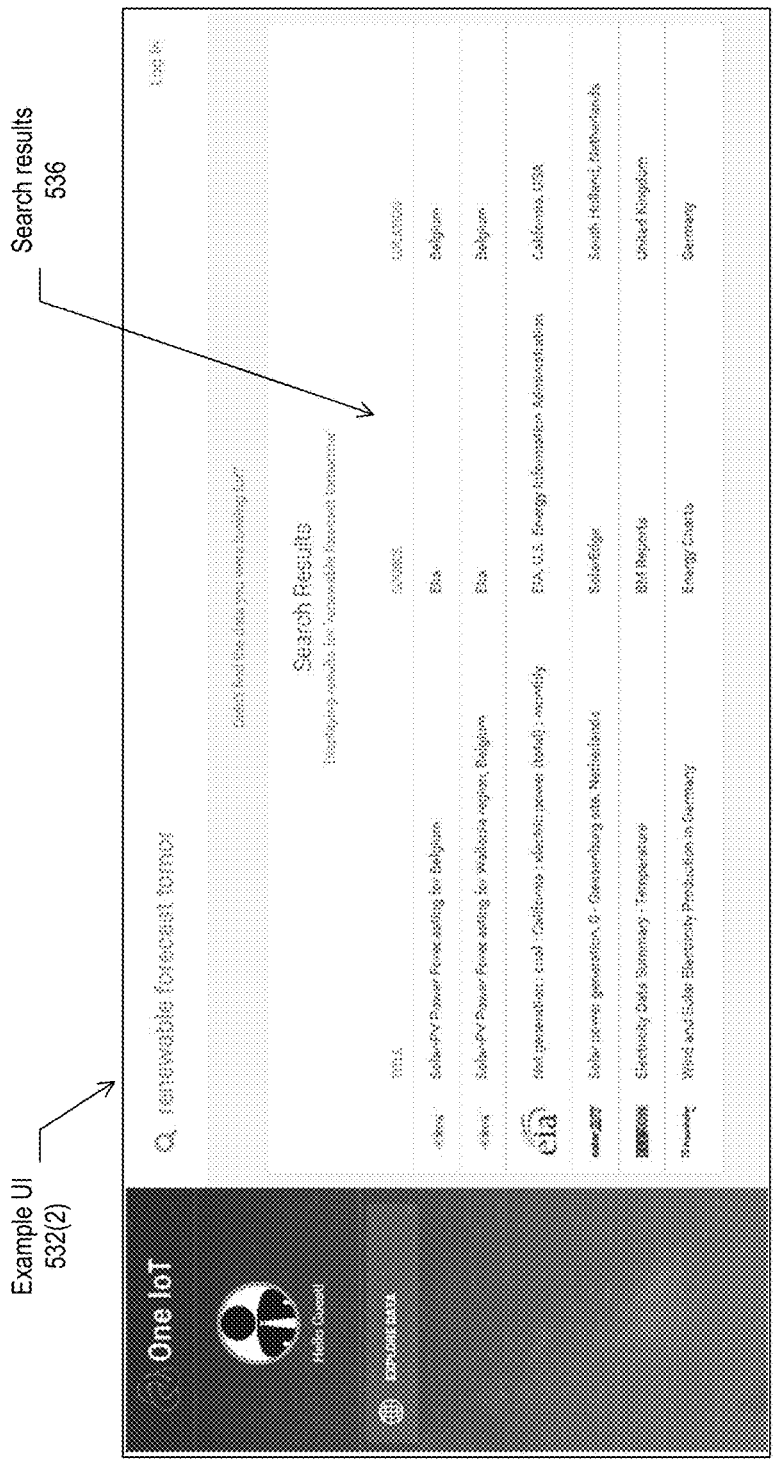
Figure 5E:
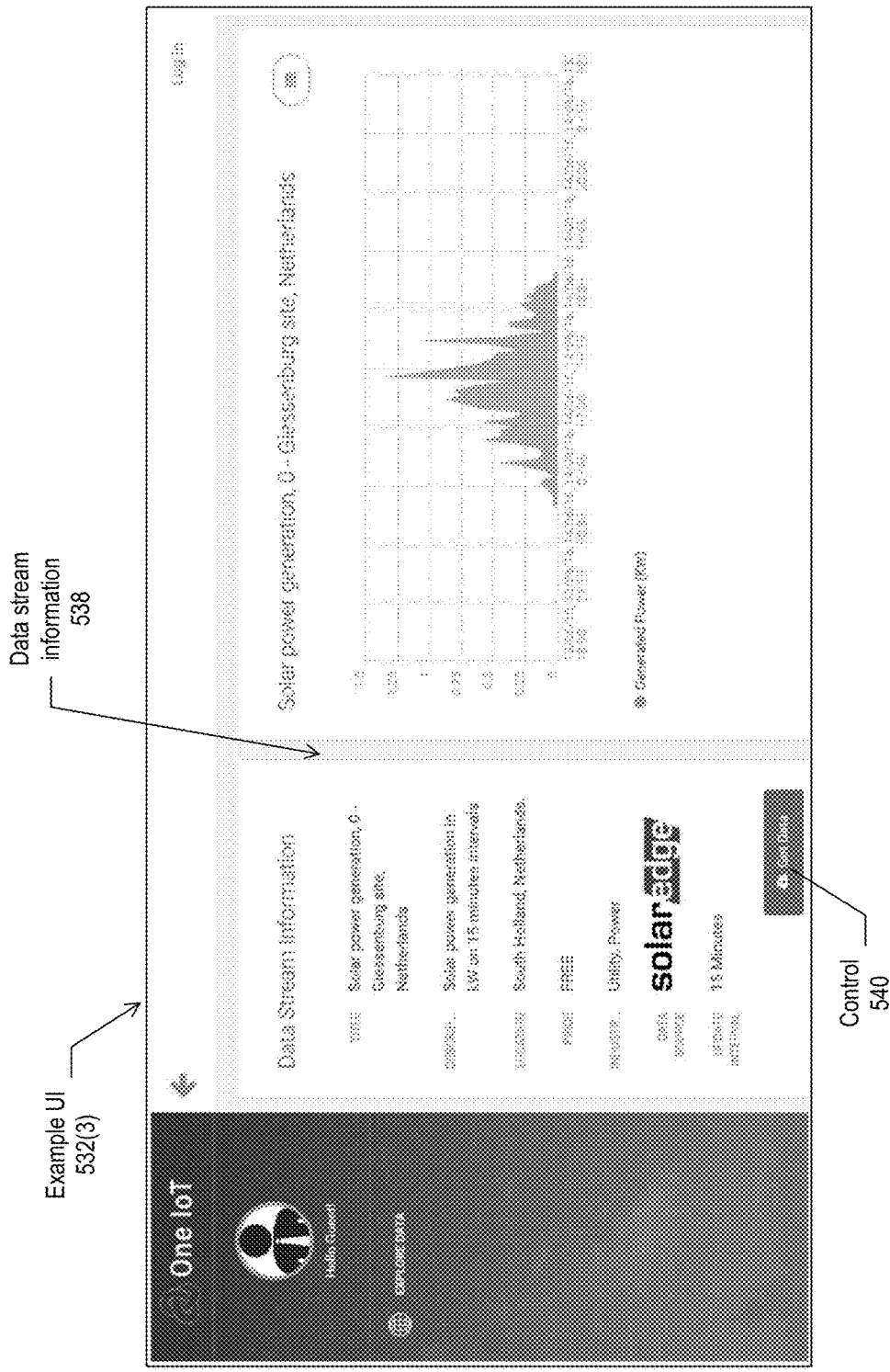

FIGS. 5C-5E depict example user interfaces (UIs) 532 that may be provided through the marketplace 122 to facilitate the sharing data between IoT platforms, according to implementations of the present disclosure.

FIG. 5C depicts an example UI 532(1) of the marketplace 122. As shown in the example, the UI 532(1) may include one or more search UI elements 534 that enable a user to enter one or more search terms (e.g., a search query) and request a search of available data streams that correspond to the search term(s). In the example shown, the user has entered the search term(s) "renewable forecast tomorrow." Implementations support search UI element(s) 534 that accept any suitable number of search terms. Search terms may be combined using Boolean operators to form a query. The UI may also enable searching based on other criteria such as ranges of date and/or time, data provider, geographic location, and so forth.

In the example of FIG. 5D, the search query of FIG. 5C has generated search results 536 that are presented in the example UI 532(2). The search results 536 may include a list of available data streams that correspond to the search terms. The search results 536 may include a title for each data stream, a source (e.g., the providing IoT network or company) for each data stream, and a geographic location corresponding to each data stream. The location may indicate the geographic area (e.g., city, state, province, county, prefecture, country, etc.) where the data of the data stream originated (e.g., where the data is collected).

The user may click on or otherwise select one of the available data streams in the search results, and the UI 532(3) may present more information regarding the selected data stream, as shown in FIG. 5E. The data stream information 538 may include, but is not limited to: a title of the stream, a description of the stream, a location where the streamed data was collected, a price of the stream, the industry and/or category associated with the stream (e.g., utility, power), the data source, and/or the update interval (e.g., how frequently the data is updated). The data stream information 538 may also include one or more visualizations of data sample(s) of the data stream. Such visualizations may include tables, charts, graphs, lists, or other graphics that are static or animated. In the example of FIG. 5E, the data stream information 538 includes a visualization of sample data that shows a variation in power generation over time. The price of a data stream may be a one-time (e.g., fixed) fee, a subscription (e.g., fee per time period), a fee per amount of data, and/or other types of prices. In the example of FIG. 5E, the data stream is offered for free.

The UI 532(3) may also include a control 540 that the user may click, gesture on, or otherwise select to request the data stream (e.g., "get data"). Clicking on the control 540 may cause the UI to present UI elements for entering payment information (e.g., if payment is due). The UI may also present information describing a network address where the data stream is available. In some implementations, the UI may present information regarding the data streams to which the user is currently subscribed, to enable the user to view information regarding the subscribed data streams, unsubscribe from a data stream, and/or otherwise manage their subscriptions.

Figure 6:
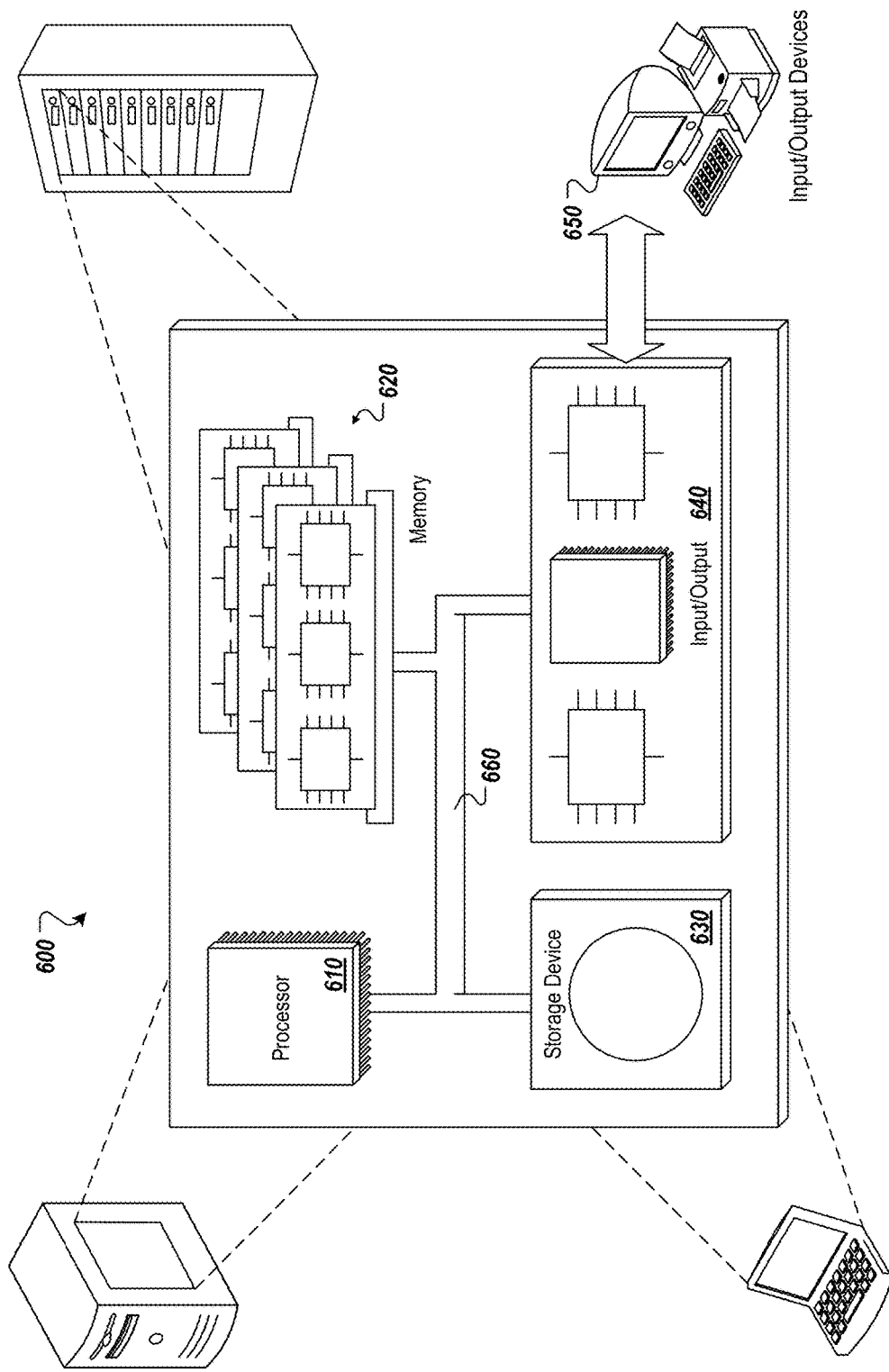
FIG. 6 depicts an example computing system, according to implementations of the present disclosure.

FIG. 6 depicts an example computing system, according to implementations of the present disclosure. The system 600 may be used for any of the operations described with respect to the various implementations discussed herein. For example, the system 600 may be included, at least in part, in one or more of the IoT device(s) 104, IoT platforms 102, brokerage server device(s) 110, and/or other computing device(s) or systems of device(s) described herein. The system 600 may include one or more processors 610, a memory 620, one or more storage devices 630, and one or more input/output (I/O) devices 650 controllable through one or more I/O interfaces 640. The various components 610, 620, 630, 640, or 650 may be interconnected through at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more networks using any network protocol.

Computing devices of the system 600 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   receiving, by the at least one processor, a communication from a first IoT platform that is communicatively coupled to a first set of Internet of Things (IoT) devices, wherein the communication from the first IoT platform describes data that is generated by the first set of IoT devices and that is available to be shared with other IoT platforms;
   determining, by the at least one processor, a second IoT platform communicatively coupled to a second set of IoT devices; and
   communicating, by the at least one processor, at least one security token to the first IoT platform and the second IoT platform, wherein the at least one security token is used to establish a peer-to-peer (P2P) connection between the first IoT platform and the second IoT platform for streaming the data from the first IoT platform to the second IoT platform, and wherein the first IoT platform anonymizes the data to remove personally identifiable information (PII) from the data prior to streaming the data to the second IoT platform.

2. The method of claim 1, wherein:
   the first IoT platform executes a first agent that provides the indication of the data available from the first IoT platform;
   the second IoT platform executes a second agent; and
   the at least one security token is communicated to enable the first agent and the second agent to establish the P2P connection.

3. The method of claim 1, wherein the streamed data includes at least one result determined through an analysis of raw data received at the first platform from the first set of IoT devices.

4. The method of claim 3, wherein the analysis is performed by at least one third party analysis module executing on the first IoT platform.

5. The method of claim 1, wherein:
   the streamed data is generated by processing raw data that is received by the first IoT platform from the first set of IoT devices; and
   the processing of the raw data includes one or more of:
      aggregating the raw data;
      filtering the raw data; and
      removing erroneous information from the raw data.

6. The method of claim 1, wherein the at least one security token is communicated from a broker that is remote from at least one of the first IoT platform or the second IoT platform.

7. The method of claim 1, further comprising:
   periodically communicating, by the at least one processor, at least one updated security token to the first IoT platform and the second IoT platform while the P2P connection is active.

8. A system, comprising:
   at least one processor; and
   a memory communicatively coupled to the at least one processor, the memory storing instructions which, when executed by the at least one processor, cause the at least one processor to perform operations comprising:
      receiving a communication from a first IoT platform that is communicatively coupled to a first set of Internet of Things (IoT) devices, wherein the communication from the first IoT platform describes data that is generated by the first set of IoT devices and that is available to be shared with other IoT platforms;
      determining a second IoT platform communicatively coupled to a second set of IoT devices; and
      communicating at least one security token to the first IoT platform and the second IoT platform, wherein the at least one security token is used to establish a peer-to-peer (P2P) connection between the first IoT platform and the second IoT platform for streaming the data from the first IoT platform to the second IoT platform, and wherein the first IoT platform anonymizes the data to remove personally identifiable information (PII) from the data prior to streaming the data to the second IoT platform.

9. The system of claim 8, wherein:
   the first IoT platform executes a first agent that provides the indication of the data available from the first IoT platform;
   the second IoT platform executes a second agent;
   the at least one security token is communicated to enable the first agent and the second agent to establish the P2P connection.

10. The system of claim 8, wherein:
   the streamed data is generated by processing raw data that is received by the first IoT platform from the first set of IoT devices; and
   the processing of the raw data includes one or more of:
      aggregating the raw data;
      filtering the raw data; and
      removing erroneous information from the raw data.

11. The system of claim 8, wherein the at least one security token is communicated from a broker that is remote from at least one of the first IoT platform or the second IoT platform.

12. The system of claim 8, the operations further comprising:
   periodically communicating at least one updated security token to the first IoT platform and the second IoT platform while the P2P connection is active.

13. The system of claim 8, the operations further comprising:
   determining a value to be provided by the second IoT platform to the first IoT platform in exchange for the streamed data.

14. The system of claim 8, wherein the data is streamed in real time as the data is generated by the first set of IoT devices.

15. One or more computer-readable media storing instructions which, when executed by at least one processor, cause the at least one processor to perform operations comprising:
- receiving a communication from a IoT first platform that is communicatively coupled to a first set of Internet of Things (IoT) devices, wherein the communication from the first IoT platform describes data that is generated by the first set of IoT devices and that is available to be shared with other IoT platforms;
- determining a second IoT platform communicatively coupled to a second set of IoT devices; and
- communicating at least one security token to the first IoT platform and the second IoT platform, wherein the at least one security token is used to establish a peer-to-peer (P2P) connection between the first IoT platform and the second IoT platform for streaming the data from the first IoT platform to the second IoT platform, and wherein the first IoT platform anonymizes the data to remove personally identifiable information (PII) from the data prior to streaming the data to the second IoT platform.

16. The one or more computer-readable media of claim 15, wherein:
- the first IoT platform executes a first agent that provides the indication of the data available from the first IoT platform;
- the second IoT platform executes a second agent; and
- the at least one security token is communicated to enable the first agent and the second agent to establish the P2P connection.

17. The one or more computer-readable media of claim 15, wherein the streamed data includes at least one result determined through an analysis of raw data received at the first IoT platform from the first set of IoT devices.

18. The one or more computer-readable media of claim 17, wherein the analysis is performed by at least one third party analysis module executing on the first IoT platform.

19. The one or more computer-readable media of claim 15, wherein:
- the streamed data is generated by processing raw data that is received by the first IoT platform from the first set of IoT devices; and
- the processing of the raw data includes one or more of:
  - aggregating the raw data;
  - filtering the raw data; and
  - removing erroneous information from the raw data.

20. The one or more computer-readable media of claim 15, wherein the at least one security token is communicated from a broker that is remote from at least one of the first IoT platform or the second IoT platform.

* * * * *